US012683100B2

(12) United States Patent
Park

(10) Patent No.: US 12,683,100 B2
(45) Date of Patent: Jul. 14, 2026

(54) BUTTON DEVICE FOR CASINO MACHINES

(71) Applicant: KORTEK CORPORATION, Incheon (KR)

(72) Inventor: Sung Jun Park, Incheon (KR)

(73) Assignee: KORTEK CORPORATION, Incheon (KR)

( * ) Notice: Subject to any disclaimer, the term of this patent is extended or adjusted under 35 U.S.C. 154(b) by 185 days.

(21) Appl. No.: 18/580,667

(22) PCT Filed: Oct. 7, 2022

(86) PCT No.: PCT/KR2022/015071

§ 371 (c)(1),
(2) Date: Jan. 19, 2024

(87) PCT Pub. No.: WO2023/075194

PCT Pub. Date: May 4, 2023

(65) Prior Publication Data

US 2024/0234048 A1 Jul. 11, 2024

(30) Foreign Application Priority Data

Oct. 28, 2021 (KR) ........................ 10-2021-0145916

(51) Int. Cl.

*H01H 13/10* (2006.01)
*H01H 13/14* (2006.01)
*H01H 13/52* (2006.01)

(52) U.S. Cl.

CPC ............ *H01H 13/10* (2013.01); *H01H 13/14* (2013.01); *H01H 13/52* (2013.01); *H01H 2231/008* (2013.01); *H01H 2231/016* (2013.01)

(58) Field of Classification Search

CPC ........ H01H 13/10; H01H 13/14; H01H 13/52; H01H 13/705; H01H 13/83; H01H 13/84;
(Continued)

(56) References Cited

U.S. PATENT DOCUMENTS 9,368,297 B2 * 6/2016 Raupach ................ H01H 13/10
10,210,698 B2 * 2/2019 Sumi ................... G07F 17/3213
(Continued)

FOREIGN PATENT DOCUMENTS

EP 2811503 A1 12/2014
KR 20-0465981 Y1 3/2013
(Continued)

OTHER PUBLICATIONS

International Search Report for PCT/KR2022/015071, mailed on Jan. 25, 2023.

*Primary Examiner* — William A Bolton
(74) *Attorney, Agent, or Firm* — Schmeiser Olsen PLLC

(57) ABSTRACT

A button device for casino machines is provided including a base installed to overlap a display panel of a display device, a push button that overlaps the base and is disposed to move vertically with respect to the base, and has a central portion through which an image displayed on the display panel is visible and a flange portion that is stepped at an outer boundary of the central portion and extends outward, and a bezel that covers the push button so that the central portion is exposed and the flange portion is hidden, and is detachably coupled to the base.

5 Claims, 5 Drawing Sheets

(58) Field of Classification Search
CPC ............. H01H 13/86; H01H 2231/008; H01H 2231/016; H01H 2207/014; H01H 2207/006; H01H 9/20
USPC ... 200/530, 520, 531, 562, 563, 341, 67 DB, 200/288
See application file for complete search history.

(56) References Cited

U.S. PATENT DOCUMENTS

| | | | | |
|---|---|---|---|---|
| 10,998,150 | B2 * | 5/2021 | Ogawa | H01H 13/04 |
| 2003/0234169 | A1 * | 12/2003 | Iwakiri | H01H 13/20 200/341 |
| 2012/0111706 | A1 | 5/2012 | Seckel et al. | |
| 2013/0130796 | A1 * | 5/2013 | Johnson | G07F 17/3209 463/34 |
| 2015/0357131 | A1 * | 12/2015 | Chen | H01H 13/20 200/345 |
| 2016/0335844 | A1 * | 11/2016 | Onoyama | H01H 13/83 |
| 2018/0075691 | A1 | 3/2018 | Sumi et al. | |

FOREIGN PATENT DOCUMENTS

| | | | |
|---|---|---|---|
| KR | 10-1842533 | B1 | 3/2018 |
| KR | 10-2017637 | B1 | 9/2019 |

* cited by examiner

BUTTON DEVICE FOR CASINO MACHINES

CROSS-REFERENCE TO RELATED APPLICATIONS

This application claims priority to PCT Application No. PCT/KR2022/015071, having a filing date of Oct. 7, 2022, claiming priority to KR Application No. 10-2021-0145916, having a filing date of Oct. 28, 2021, the entire both contents of which are hereby incorporated by reference.

FIELD OF TECHNOLOGY

The following relates to a button device for casino machines, and more specifically, to a button device for casino machines that is easy to assemble and disassemble and has a reduced protrusion height.

BACKGROUND

A casino machine, such as a slot machine, is equipped with a display device that outputs an image and a button device for inputting instructions. The button device may be fixedly disposed in a position that does not overlap the image displayed on the display device. Additionally, the button device may induce an intuitive and quick input response in response to changes in the image, and may be fixedly disposed in a position that overlaps the image so that a three-dimensional effect can be felt when pressed.

A button device arranged to overlap an image includes a base, a push button, and a bezel that are fixedly supported on a display device. The bezel surrounds the periphery of the push button and is fixed to the base to prevent the push button from being separated. When a button device for casino machines protrudes too high from a display panel, it can cause severe distortion of the image displayed in the push button and strain the wrist of a user pressing the push button. Therefore, it is necessary to minimize the protrusion height, and assembly and disassembly of the base and the bezel should be reliable and easy.

The conventional technology is disclosed in Korean Patent Publication No. 10-2017637 (registered on Aug. 28, 2019, title: Button device for casino machines).

SUMMARY

An aspect relates to a button device for casino machines that has a minimal height protruding from a display panel and is reliable and easy to assemble and disassemble.

One aspect of embodiments of the present invention provide a button device for casino machines including: a base installed to overlap a display panel of a display device: a push button that overlaps the base and is disposed to move vertically with respect to the base, and has a central portion through which an image displayed on the display panel is visible and a flange portion that is stepped at an outer border of the central portion and extends outward: and a bezel that covers the push button so that the central portion is exposed and the flange portion is hidden, and is detachably coupled to the base, wherein the base includes a bottom plate and a plurality of hooks that protrude upward from an outer circumferential portion of the bottom plate and are covered by the bezel, and the bezel includes a plurality of interference protrusions that mutually interfere with the plurality of hooks to prevent the bezel from being separated from the base when the push button is covered.

Each of the plurality of hooks may include a pair of pillars that protrude upward from the bottom plate and are spaced apart from each other, a body portion that is connected to one end and the other end of each of the pair of pillars, and a triangular protrusion that is formed at an upper end portion of the body portion to protrude in a stepped manner from the body portion, and each of the plurality of interference protrusions may be bent and protrude inward from a lower end portion of the bezel.

A hook clearance slot may be formed in the bottom plate so that a lower end of the body portion is spaced apart from the bottom plate.

A disassembly slot extending from an outer circumferential boundary of the bottom plate to the hook clearance slot may be formed so that a tool for pressing the plurality of hooks enters the hook clearance slot to separate the bezel, which covers the push button and is coupled to the base, from the base.

The triangular protrusion may be positioned to be spaced apart from the pair of pillars, and a recessed dent may be formed in a central portion of the triangular protrusion does.

An outer circumferential boundary of the bottom plate may not protrude further outward than an outer circumferential boundary of the bezel.

Since a button device for casino machines of embodiments of the present invention adopts a detachable fastening method using a hook and an interfering protrusion, it is easy to design by minimizing the height protruding from a display panel. Consequently, the distortion of an image displayed in a central portion of a push button is minimized, and the burden on a user's wrist pressing the push button is reduced, thereby preventing user fatigue and wrist injury.

In addition, since a bezel can be fastened simply by pressing the bezel down on a base and the base and the bezel can be separated by pushing a hook using a tool such as a pin, the assembly and disassembly work is made easy and reliable.

In addition, since a bezel is fastened and separated by a hook and an interfering protrusion rather than rotating the bezel with respect to a base, the structure of embodiments of the present invention can be applied even when a planar shape of a push button and the bezel is not circular.

BRIEF DESCRIPTION

Some of the embodiments will be described in detail, with references to the following Figures, wherein like designations denote like members, wherein.

DETAILED DESCRIPTION

Hereinafter, with reference to the attached drawings, a button device for casino machines according to an embodiment of the present invention will be described in detail. Terms used in the specification are terms used to appropriately express exemplary embodiments of the present invention. These terms may vary depending on the intention of the user or operator or the conventions of the field to which embodiments of this invention belong. Therefore, definitions of these terms should be made based on the content throughout the specification.

Figure 1A:
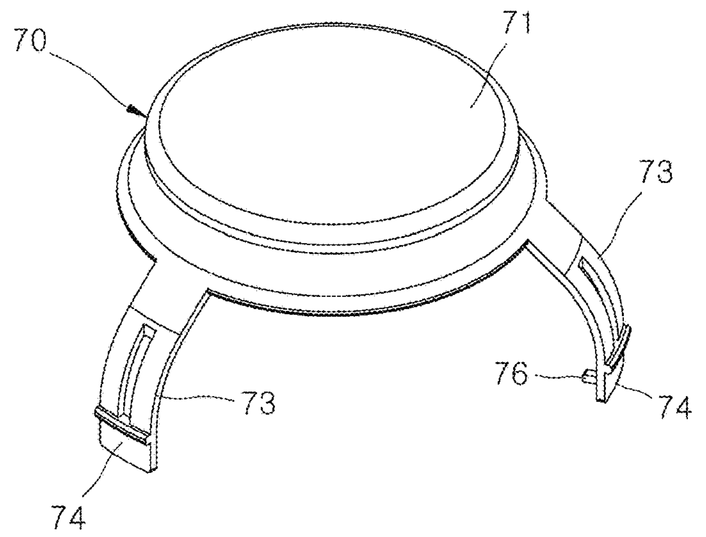
FIGS. 1A-1C are is a perspective views of a button device for casino machines according to an embodiment of the present invention.
Figure 1B:
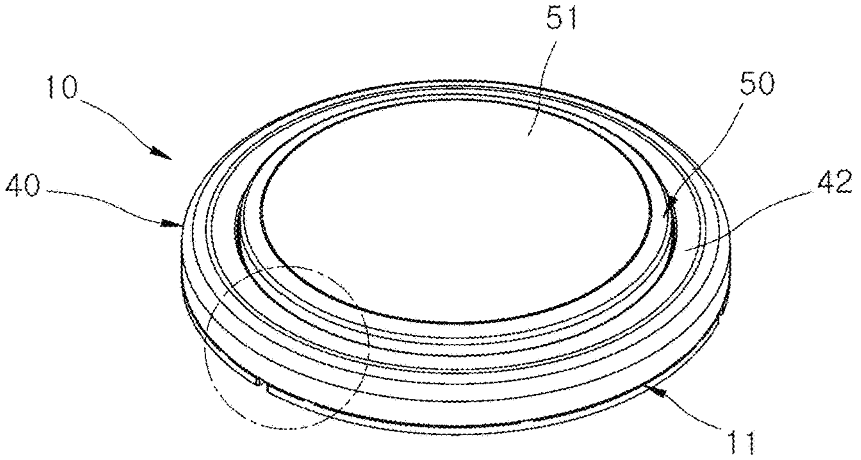
Figure 1C:
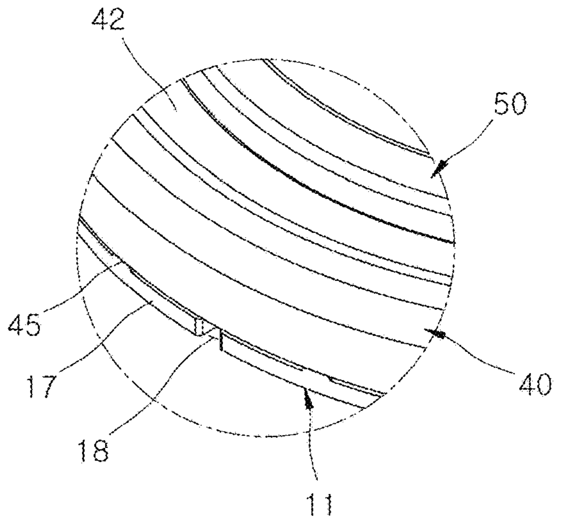
Figure 2A:
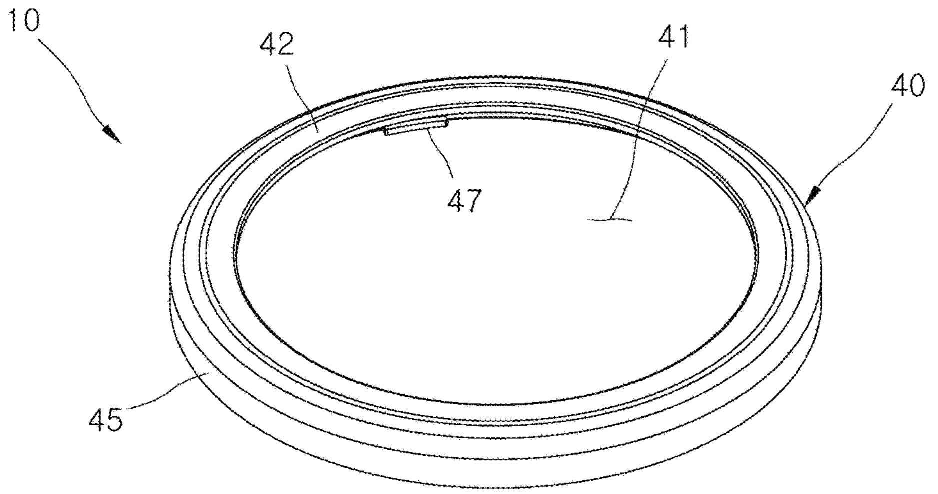
FIGS. 2A-2C are is an exploded perspective views of a button device for casino machines according to an embodiment of the present invention.
Figure 2B:
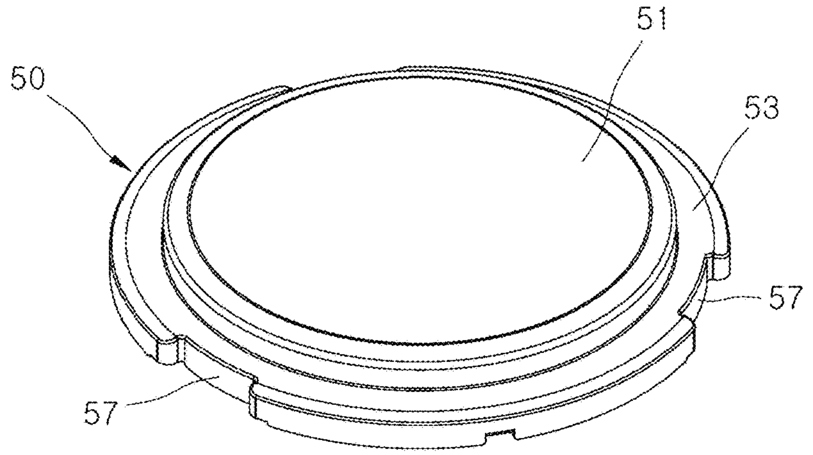
Figure 2C:
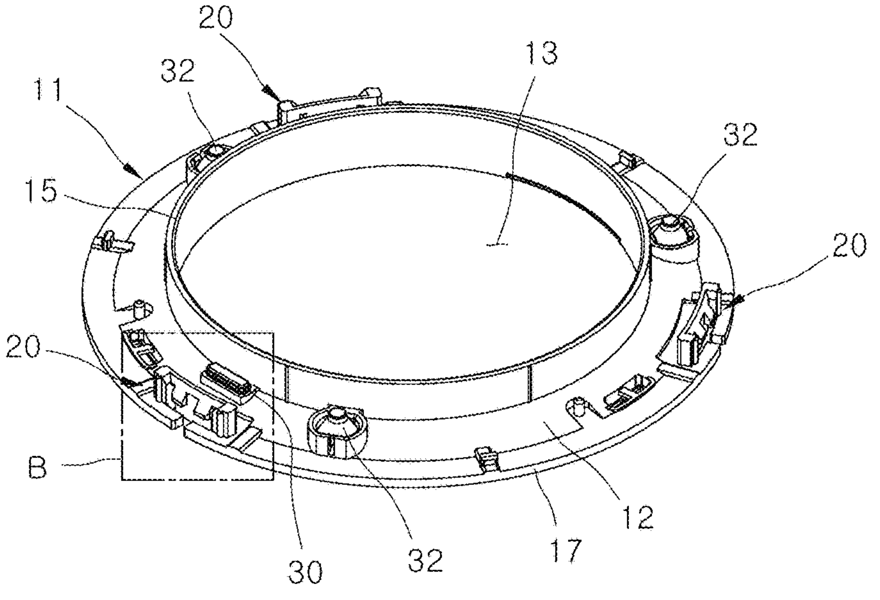
Figure 3:
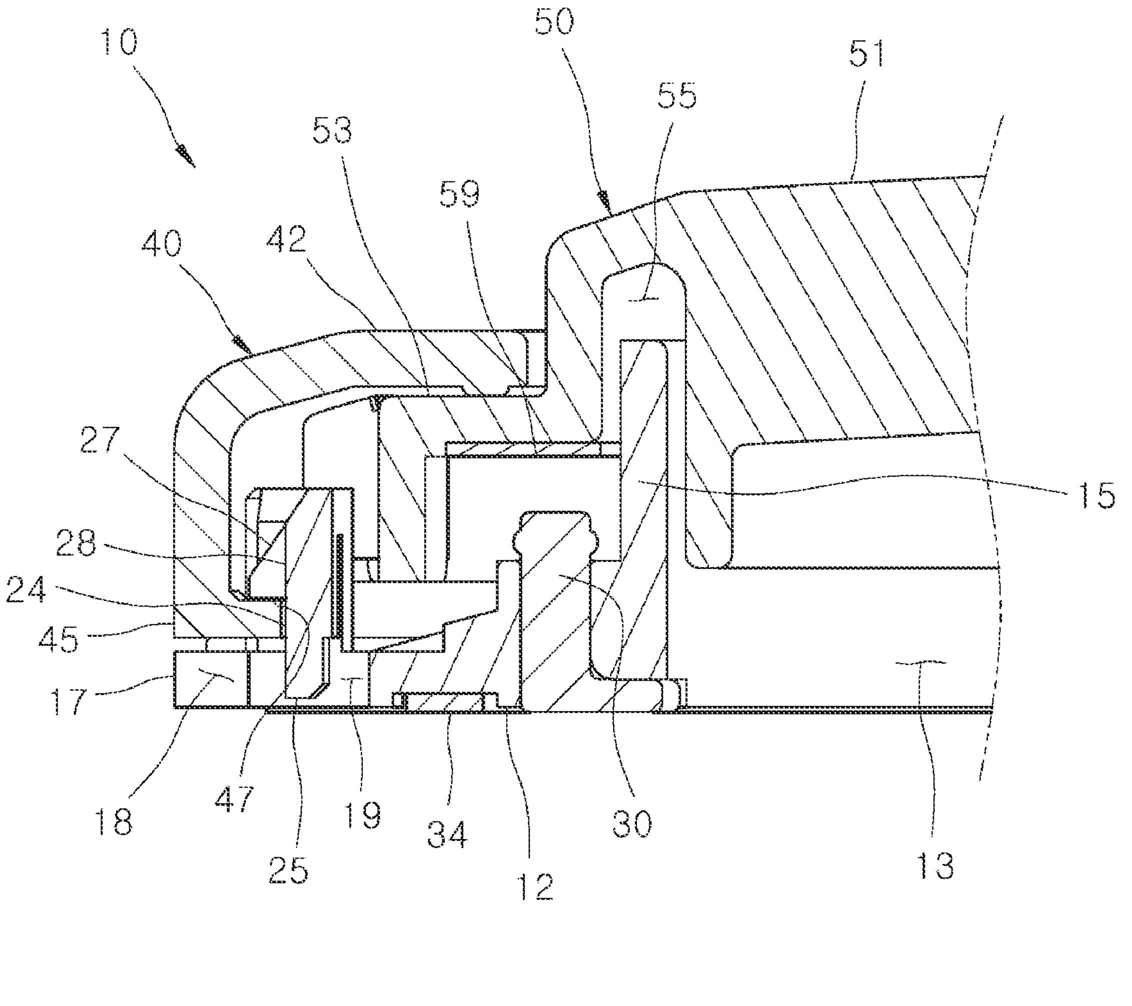
FIG. 3 is a cross-sectional view of the button device for casino machines in FIGS. 1A-1C.
Figure 4:
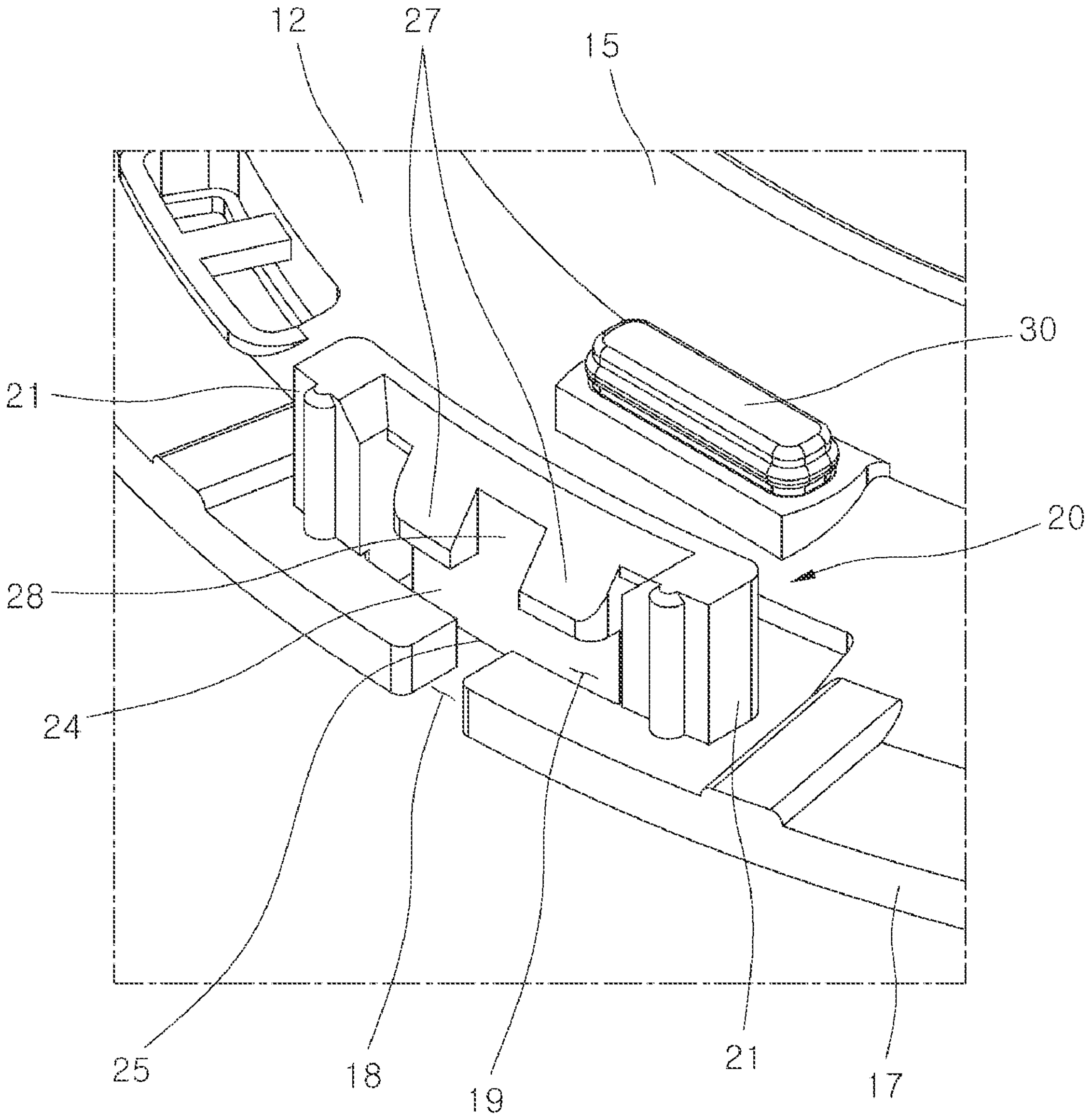
FIG. 4 is an enlarged view of portion B in FIG. 2C.
Figure 5:
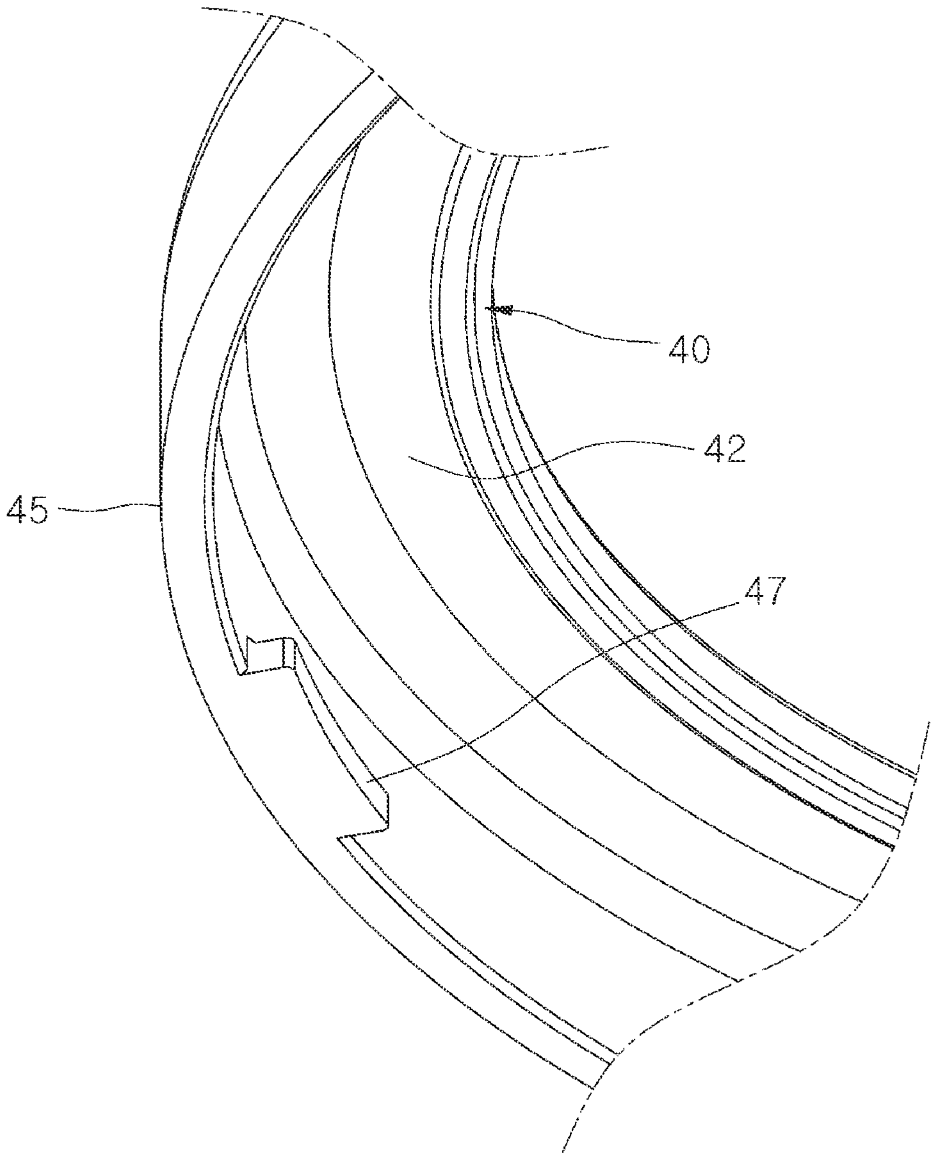
FIG. 5 is a bottom perspective view of a portion of a bezel in FIG. 2A.

FIGS. 1A-1C are perspective views of a button device for casino machines according to an embodiment of the present invention, FIGS. 2A-2C are exploded perspective views of a button device for casino machines according to an embodiment of the present invention, FIG. 3 is a cross-sectional view of the button device for a the casino machine in FIGS. 1A-1C, FIG. 4 is an enlarged view of portion B in FIG. 2C, and FIG. 5 is a bottom perspective view of a portion of a bezel in FIG. 2A.

Referring to FIGS. 1A to 5, a button device 10 for casino machines according to the embodiment of the present invention is, for example, a device for inputting a specific user instruction during a game using a casino machine such as a slot machine, and may be fixedly attached to a display device (not shown) of the casino machine.

The button device 10 for casino machines includes a base 11, a push button 50, and a bezel 40.

The base 11 is installed to overlap a display panel of the display device. Specifically, the base 11 may be attached by an adhesive member 34 to the surface of a protective glass installed to cover the display panel to protect the display panel. The base 11 includes a bottom plate 12 having a substantially ring shape with a hollow 13 formed therein, a button lifting guide protrusion 15 that is bent and protrudes upward from an outer circumferential boundary of the bottom plate 12, and a plurality of hooks 20 that protrude upward from an outer circumferential portion of the bottom plate 12 and are covered by the bezel 40.

Each hook 20 includes a pair of pillars 21 that protrude upward from the bottom plate 12 and are spaced apart from each other, a body portion 24 connected to one end and the other end of each of the pair of pillars 21 in a longitudinal direction, and a triangular protrusion 27 formed at an upper end portion of the body portion 24 to protrude in a stepped manner from the body portion 24. The triangular protrusion 27 includes a lower stepped surface that protrudes outward in a stepped manner from an outer surface of the body portion 24 and an upper inclined surface that extends obliquely upward from an upper side of the lower stepped surface.

The body portion 24 has a length perpendicular to the height greater than the height in the vertical direction. The thickness of the body portion 24 excluding the triangular protrusion 27 is smaller than the length and height of the body portion 24. The thickness of the pillar 21 is greater than the thickness of the body portion 24.

A lower end of the pillar 21 is connected to the bottom plate 12, but a lower end 25 of the body portion 24 is separated from the bottom plate 12. Specifically, a hook clearance slot 19 is formed in the bottom plate 12 so that the lower end 25 of the body portion 24 is spaced apart from the bottom plate 12 with a gap therebetween.

With the hook 20 having the above configuration, when the triangular protrusion 27 or the body portion 24 is pressed in a direction from an outer circumferential boundary 17 of the bottom plate 12 toward an inner circumferential boundary, the body portion 24 is easily elastically deformed in a pressing direction and may be easily restored to its original position when the pressing force is removed.

The bottom plate 12 may be formed with a disassembly slot 18 extending from its outer circumferential boundary 17 to the hook clearance slot 19 and connected to the hook clearance slot 19. For example, a tool such as a pin may enter the disassembly slot 18 from the outside of the base 11 to press the hook 20, specifically the body portion 24, to be easily elastically deformed.

In each hook 20, the triangular protrusion 27 is not connected to the pair of pillars 21 but is positioned to be spaced apart from the pair of pillars 21, and a recessed dent 28 is formed in a central portion of the triangular protrusion 27.

Therefore, when the triangular protrusion 27 or the body portion 24 is pressed in the direction from the outer circumferential boundary 17 of the bottom plate 12 toward the inner circumferential boundary, the body portion 24 is elastically deformed with a greater displacement in the direction in which it is pressed, and may be easily restored to its original position when the pressing force is removed.

The push button 50 overlaps the base 11 and is disposed to move vertically with respect to the base 11. The push button 50 includes a central portion 51 that is positioned vertically aligned with the hollow 13 of the base 11 and where an image displayed on a display panel is visible, and a flange portion 53 that is stepped at the outer border of the central portion 51 and extends outward.

In an outer circumferential boundary of the flange portion 53, a plurality of hook-avoiding dents 57 are formed to avoid the plurality of hooks 20. The central portion 51 may be provided with a lens that enlarges or reduces an image of the display panel exposed through the hollow 13, or a filter that provides a visual effect to the image.

A lifting guide groove 55 into which the button lifting guide protrusion 15 is inserted is formed in a lower side of the push button 50. Accordingly, when a user presses the push button 50 and the push button 50 descends with respect to the base 11 and then returns by ascending, the central portion 51 remains in a state of being aligned with the hollow 13.

A plurality of elastic members 32 are installed on the bottom plate 12 to come into contact with a lower side of the push button 50 and be elastically pressed downward when the push button 50 is pressed downward. Therefore, when a user presses the push button 50, the plurality of elastic members 32 are elastically compressed, and when the user's pressing force is removed, the plurality of elastic members 32 are elastically restored and the push button 50 rises to its original position.

An inner conductive portion 59 made of a conductor is installed on the lower side of the push button 50. A conductive member 30 made of a conductor is installed on the bottom plate 12 so as to pass through the bottom plate 12. An upper end portion of the conductive member 30 is positioned to be vertically aligned with the inner conductive portion 59.

When a user presses the push button 50 and the push button 50 moves down, the inner conductive portion 59 and the upper end portion of the conductive member 30 come into contact with each other to allow an electrical connection, and accordingly, an instruction that matches the intention of a user playing a game using the casino machine is input to the casino machine.

The bezel 40 is a ring-shaped member with a hollow 41 corresponding to the central portion 51 of the push button 50 to expose the central portion 51. The bezel 40 covers the push button 50 so that the central portion 51 of the push button 50 is exposed and the flange portion 53 is hidden, and is detachably coupled to the base 11.

The bezel 40 includes an inner circumferential portion 42 that defines the hollow 41, an outer circumferential portion is bent downward and extended from the inner circumferential portion 42, and a plurality of interference protrusions 47, which correspond one-to-one with the plurality of hooks 20 and are bent and protrude inward from the lower end of the outer circumferential portion of the bezel 40. The plurality of interference protrusions 47 mutually interfere with the plurality of hooks 20 so that the bezel 40 is not unintentionally separated from the base 11 when the push button 50 is covered.

With this configuration, when the bezel 40 is coupled to the base 11 so that the plurality of interference protrusions 47 are fastened to the plurality of hooks 20, the outer circumferential boundary 17 of the bottom plate 12 does not protrude further outward than an outer circumferential boundary 45 of the bezel 40. Therefore, the assembled button device 10 for casino machines has an elegant appearance because the bottom plate 12 and the disassembly slot 18 are not visible unless you look closely. In addition, the assembled button device 10 for casino machines may give the impression that the bezel 40 and the base 11 surrounding the push button 50 are formed as one piece.

When coupling the bezel 40 to the base 11, an operator approaches the bezel 40 by pushing the bezel 40 downward toward the base 11 with the plurality of interference protrusions 47 and the plurality of hooks 20 aligned vertically. Then, the plurality of interference protrusions 47 come into contact with and press the upper inclined surfaces of the triangular protrusions 27 of the plurality of hooks 20, and the body portions 24 of the hooks 20 retreat toward the inside, that is, the hollow 13, within the hook clearance slot 19 due to the pressing force, and then the plurality of interference protrusions 47 descend below the triangular protrusion 27.

As a result, when the pressing force of the interference protrusion 47 does not act on the triangular protrusion 27, the body portion 24 is elastically restored to its original position and the base 11 and the bezel 40 are fastened. In this state, even when the bezel 40 is pulled upward, the bezel 40 is not separated from the base 11 because the interference protrusion 47 is blocked by the lower stepped surface of the triangular protrusion 27.

When separating the bezel 40 coupled to the base 11 from the base 11, a tool designed to simultaneously press the plurality of hooks 20, that is, a disassembly tool 70, may be used.

The disassembly tool 70 includes an upper handle 71, a plurality of gripping fingers 73 extending downward from the handle 71, and push pins 76 protruding inward from lower ends 74 of the gripping fingers 73, The gripping fingers 73 and hooks 20 have a one-to-one correspondence. The plurality of gripping fingers 73 may be elastically biased in a direction in which their ends 74 approach each other, that is, in a retraction direction.

When separating the bezel 40 from the base 11, the operator holds the handle 71 of the disassembly tool 70 and lowers the disassembly tool 70 closer to the button device 10. Simultaneously, the push pins 76 of the plurality of gripping fingers 73 are inserted into a plurality of disassembly slots 18.

The push pin 76 inserted into each of the disassembly slots 18 presses the body portion 24 of the hook 20 toward the inside, that is, the hollow 13. In this case, when the push pin 76 does not press the body portion 24 with a strong force, the operator may manually press the gripping finger 73 inward to push the body portion 24 inward.

In this way, when the plurality of body portions 24 are simultaneously pushed inward by the plurality of push pins 76 and the triangular protrusion 27 does not block the interference protrusion 47, the operator may hold, lift, and separate the bezel 40 from the base 11.

Meanwhile, the disassembly tool 70 is not necessarily required to separate the bezel 40 from the base 11. For example, by the operator inserting a plurality of pins into the plurality of disassembly slots 18 using both hands or a plurality of operators inserting a plurality of pins into the plurality of disassembly slots 18, the bezel 40 may be separated from the base 11.

The button device 10 for casino machines adopts a detachable fastening method using the hooks 20 and the interference protrusions 47 and is easy to design by minimizing the height protruding from the display panel. Accordingly, distortion of the image displayed in the central portion 51 of the push button 50 is minimized, and the burden on the user's wrist pressing the push button 50 is reduced, thereby preventing user fatigue and wrist injury.

In addition, since the bezel 40 can be fastened simply by pressing down on the base 11 and the bezel 40 can be separated by pushing the hooks 20 using a tool such as a pin, the assembly and disassembly work is made easy and reliable.

Meanwhile, the button device 10 for casino machines shown in the drawing has a circular planar shape, but this circular shape is only exemplary, and embodiments of the present invention may be implemented as a button device whose planar shape is a triangle or another closed curve shape. This is because the bezel 40 is not fastened and separated by rotating the bezel 40 with respect to the base 11, but is fastened and separated by the hooks 20 and the interference protrusions 47.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A button device for casino machines, comprising:

a base installed to overlap a display panel of a display device;

a push button that overlaps the base and is disposed to move vertically with respect to the base, and has a central portion through which an image displayed on the display panel is visible and a flange portion that is stepped at an outer boundary of the central portion and extends outward; and a bezel that covers the push button so that the central portion is exposed and the flange portion is hidden, and is detachably coupled to the base, wherein the base includes a bottom plate and a plurality of hooks that protrude upward from an outer circumferential portion of the bottom plate and are covered by the bezel, and wherein the bezel includes a plurality of interference protrusions that mutually interfere with the plurality of hooks to prevent the bezel from being separated from the base when the push button is covered;

wherein:

each of the plurality of hooks includes a pair of pillars that protrude upward from the bottom plate and are spaced apart from each other, a body portion that is connected to one end and the other end of each of the pair of pillars, and a triangular protrusion that is formed at an upper end portion of the body portion to protrude in a stepped manner from the body portion; and each of the plurality of interference protrusions is bent and protrudes inward from a lower end portion of the bezel.

2. The button device of claim 1, wherein a hook clearance slot is formed in the bottom plate so that a lower end of the body portion is spaced apart from the bottom plate.

3. The button device of claim 2, wherein an outer circumferential boundary of the bottom plate does not protrude further outward than an outer circumferential boundary of the bezel.

4. The button device of claim 2, wherein a disassembly slot extending from an outer circumferential boundary of the bottom plate to the hook clearance slot is formed so that a tool for pressing the plurality of hooks enters the hook clearance slot to separate the bezel, which covers the push button and is coupled to the base, from the base.

5. The button device of claim 4, wherein:

the triangular protrusion is positioned to be spaced apart from the pair of pillars; and a recessed dent is formed in a central portion of the triangular protrusion.

* * * * *